(12) United States Patent
Hotta et al.

(10) Patent No.: US 11,401,924 B2
(45) Date of Patent: Aug. 2, 2022

(54) LINEAR COMPRESSOR AND LINEAR COMPRESSOR CONTROL SYSTEM

(71) Applicant: Hitachi Automotive Systems, Ltd., Hitachinaka (JP)

(72) Inventors: Kaito Hotta, Tokyo (JP); Wataru Hatsuse, Tokyo (JP); Masaki Koyama, Tokyo (JP); Tsutomu Ito, Hitachinaka (JP); Yoshinori Kawai, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 25 days.

(21) Appl. No.: 16/979,035

(22) PCT Filed: Feb. 19, 2019

(86) PCT No.: PCT/JP2019/006066
§ 371 (c)(1),
(2) Date: Sep. 8, 2020

(87) PCT Pub. No.: WO2019/176471
PCT Pub. Date: Sep. 19, 2019

(65) Prior Publication Data
US 2021/0071653 A1 Mar. 11, 2021

(30) Foreign Application Priority Data

Mar. 12, 2018 (JP) .............................. JP2018-044369

(51) Int. Cl.
*F04B 35/04* (2006.01)
*F04B 49/12* (2006.01)
(Continued)

(52) U.S. Cl.
CPC ............ *F04B 35/045* (2013.01); *F04B 49/06* (2013.01); *F04B 39/0005* (2013.01); *F04B 49/12* (2013.01);
(Continued)

(58) Field of Classification Search
CPC ............ F04B 35/045; F04B 2203/0401; F04B 2203/0402
See application file for complete search history.

(56) References Cited

U.S. PATENT DOCUMENTS

| 5,673,165 A * | 9/1997 | Kuhn | H01F 7/1844 |
| | | | 361/154 |
| 6,819,209 B2 * | 11/2004 | Yajima | F16F 15/03 |
| | | | 335/257 |

(Continued)

FOREIGN PATENT DOCUMENTS

| JP | 2002-138957 A | 5/2002 |
| JP | 2003-065244 A | 3/2003 |

(Continued)

OTHER PUBLICATIONS

International Search Report with English translation and Written Opinion issued in corresponding application No. PCT/JP2019/006066 dated May 28, 2019.

*Primary Examiner* — Patrick Hamo
(74) *Attorney, Agent, or Firm* — Foley & Lardner (57) ABSTRACT

Provided are a linear compressor and a linear compressor control system that do not require a sensor for detecting a position of a mover, and can compute a mover position with high accuracy, in consideration of position dependency of an induced voltage constant. A linear compressor 20 includes a (Continued)

field element 11 having a first end connected to elastic bodies (201a and 201b) and including a permanent magnet 111, an armature 12 having a winding 122 wound around a magnetic pole 121, and a linear motor 10 that causes the field element 11 and the armature 12 to reciprocate relatively in an axial direction. A stroke of a piston is controlled so that a portion where a gradient of an induced voltage when the induced voltage computed on the basis of a voltage command value output to the linear motor 10 and a value of a current flowing through the winding 122 is at a predetermined value is within a predetermined range corresponds to a top dead center and/or a bottom dead center of a stroke of a piston 212 connected to a second end of the field element 11.

8 Claims, 10 Drawing Sheets (51) Int. Cl.
*F04B 49/06* (2006.01)
*F04B 39/00* (2006.01)

(52) U.S. Cl.
CPC ............... *F04B 2203/0401* (2013.01); *F04B 2203/0402* (2013.01); *F25B 2400/073* (2013.01)

(56) References Cited

U.S. PATENT DOCUMENTS

| | | | |
|---|---|---|---|
| 7,307,397 B2* | 12/2007 | Izumi | H02P 25/032 318/560 |
| 8,143,817 B2* | 3/2012 | Izumi | H02P 25/032 318/114 |
| 2003/0059320 A1 | 3/2003 | Kim | |
| 2004/0108824 A1* | 6/2004 | Ueda | H02P 25/032 318/114 |
| 2007/0001630 A1* | 1/2007 | Dainez | H02P 23/0004 318/109 |
| 2008/0189935 A1 | 8/2008 | Hyeon | |

FOREIGN PATENT DOCUMENTS

| | | |
|---|---|---|
| JP | 2004-007890 A | 1/2004 |
| JP | 2007-506024 A | 3/2007 |
| JP | 2008-005633 A | 1/2008 |

* cited by examiner

[WAVEFORM SHOWING CHANGE IN INDUCED VOLTAGE CONSTANT Ke WITH RESPECT TO TIME]

[WAVEFORM SHOWING CHANGE IN INDUCED VOLTAGE E (Ke×v) WITH RESPECT TO TIME]

FIG. 10

LINEAR COMPRESSOR AND LINEAR COMPRESSOR CONTROL SYSTEM

TECHNICAL FIELD

The present invention relates to a reciprocating linear motor, and more particularly, to a linear compressor equipped with a linear motor, and a linear compressor control system.

BACKGROUND ART

Linear compressors have a free piston structure, and a top dead center and a bottom dead center of a mover are not mechanically constrained. Thus, a change in stroke length causes a change in flow rate, and it is therefore required to control the stroke and output a desired flow rate. However, there is a demand for omitting position sensors to reduce cost, and it is important to detect and control a mover position without using sensors.

For example, PTL 1 discloses a linear motor control system that calculates an induced voltage from a voltage and a current to compute and detect a stroke. Specifically, PTL 1 discloses that an induced voltage e(t) is expressed as a function of an induced voltage coefficient α (thrust coefficient) that is dependent on magnetic characteristics and a drive circuit of a linear motor and a speed vp(t) of a mover (piston), and is expressed as a function of $e(t)=\alpha v_P(t)$, and describes that it is assumed that a value of the induced voltage coefficient α is a constant value regardless of the position of the mover. PTL 1 also describes a method of measuring the induced voltage coefficient α in which an external measuring instrument is used to measure an effective value V of a motor voltage, an effective value I of a motor current, and a phase difference θ while an external sensor (laser displacement meter or the like) is used to measure a stroke ST of the mover under optional operating conditions (a motor voltage magnitude, a motor voltage angular velocity, and load conditions).

CITATION LIST

Patent Literature

PTL 1: JP 2008-5633 A

SUMMARY OF INVENTION

Technical Problem

However, the configuration described in PTL 1 is based on an assumption that an induced voltage coefficient (also referred to as an induced voltage constant) is not dependent on the position of the mover in the first place, and this means that the computed position of the mover is not reliable. That is, it is not possible to avoid a deviation from the actual position of the mover. Moreover, the configuration in which a sensor is used to measure the position of the mover causes an increase in size of a device.

It is therefore an object of the present invention to provide a linear compressor and a linear compressor control system that do not require a sensor for detecting the position of the mover, and can compute the mover position with high accuracy, in consideration of position dependency of the induced voltage constant.

Solution to Problem

In order to solve the problems described above, a linear compressor according to the present invention includes a field element having a first end connected to an elastic body and including a permanent magnet, an armature having a winding wound around a magnetic pole, and a linear motor that causes the field element and the armature to reciprocate relatively in an axial direction, in which a stroke of a piston is controlled to cause a portion where a gradient of an induced voltage when the induced voltage that is computed on the basis of a voltage command value output to the linear motor and a value of a current flowing through the winding is at a predetermined value is within a predetermined range to correspond to a top dead center and/or a bottom dead center of the stroke of the piston connected to a second end of the field element.

Moreover, a linear compressor control system according to the present invention includes a field element having a first end connected to an elastic body and including a permanent magnet, an armature having a winding wound around a magnetic pole, a linear motor that causes the field element and the armature to reciprocate relatively in an axial direction, and a control device that controls a voltage applied to the winding on the basis of at least a current flowing through the winding, in which the control device obtains an induced voltage on the basis of a voltage command value output to the linear motor and a value of the current flowing through the winding, and performs a control to cause a portion where a gradient of the induced voltage when the obtained induced voltage is at a predetermined value is within a predetermined range to correspond to a top dead center and/or a bottom dead center of a stroke of a piston connected to a second end of the field element.

Advantageous Effects of Invention

The present invention can provide a linear compressor and a linear compressor control system that do not require a sensor for detecting the position of the mover, and can compute the mover position with high accuracy in consideration of the position dependency of the induced voltage constant.

Problems, configurations, and effects other than those described above will become apparent from the following description of an embodiment.

DESCRIPTION OF EMBODIMENTS

An embodiment of the present invention will be described below with reference to the drawings. The same components are denoted by the same reference numerals, and repeated description thereof will be omitted. In the present specification, for convenience of description, X, Y, and Z directions orthogonal to each other are used as terms indicating directions, and a gravity direction (vertical direction) may be parallel to any of X, Y, and Z directions, or may be in any other direction.

Various components of the embodiment described later do not necessarily have to be individually independent from each other. For example, a component may be constituted by a plurality of members, a member may constitute a plurality of components, a certain component may be a part of another component, or a part of a certain component may overlap with a part of another component.

First Embodiment

First, a linear motor equipped on a linear compressor according to this embodiment will be described.

<Linear Motor 10>

Figure 2:
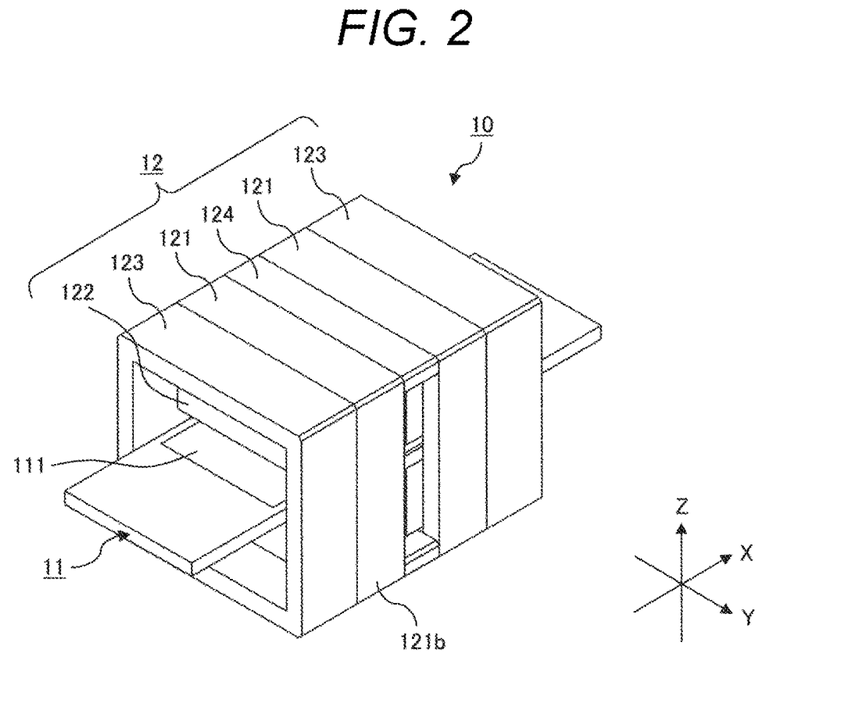
FIG. 2 is a perspective view of a linear motor.
Figure 3:
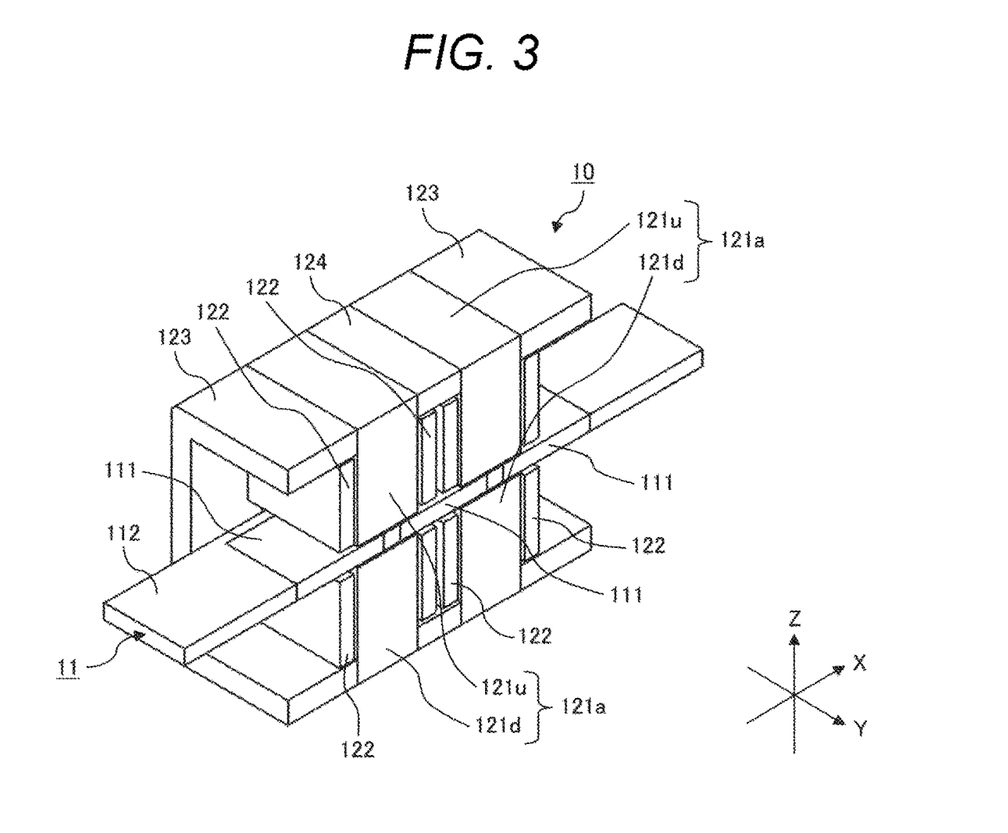
FIG. 3 is an X-Z plane cross-sectional view of the linear motor illustrated in FIG. 2.

FIG. 2 is a perspective view of a linear motor 10, and FIG. 3 is an X-Z plane cross-sectional view of the linear motor 10 illustrated in FIG. 2.

As illustrated in FIGS. 2 and 3, the linear motor 10 includes a field element 11 having three permanent magnets 111, and an armature 12. This embodiment describes, as an example, a configuration in which the field element 11 is a mover and the armature 12 is a stator. Note that the configuration is not limited to this, and the field element 11 may be a stator and the armature 12 may be a mover. In other words, the configuration is only required to allow the field element 11 and the armature 12 to reciprocate relatively.

[Armature 12]

As illustrated in FIG. 2, the armature 12 includes two magnetic poles 121, four windings 122, a spacer 124 provided between the two magnetic poles 121, and two end bridges 123. The magnetic poles 121 are constituted by, for example, laminated electromagnetic steel sheets. As illustrated in FIG. 3, each of the magnetic poles 121 has a magnetic pole tooth 121$u$ and a magnetic pole tooth 121$d$ (also referred to as teeth) that face each other in the Z direction with a gap therebetween, and these two magnetic pole teeth 121$u$ and 121$d$ constitute a set of magnetic pole teeth 121$a$. The windings 122 are wound one around each of the magnetic pole teeth 121$u$ and 121$d$. Moreover, the two sets of magnetic pole teeth 121$a$ are spaced apart from each other in the X direction by a distance defined by the spacer 124.

[Field Element (Mover) 11]

The field element (mover) 11 is located in the gaps between the magnetic pole teeth 121$u$ and the magnetic pole teeth 121$d$ constituting the sets of magnetic pole teeth 121$a$, and moves relatively with respect to the armature 12 in the X direction. The field element (mover) 11 includes the three flat plate-shaped permanent magnets 111 and a frame 112 for fixing the permanent magnets 111. The three flat plate-shaped permanent magnets 111 are magnetized in the Z direction. When a voltage is applied to the windings 122 of the armature 12 to cause a current to flow, a magnetic flux is generated between the magnetic pole teeth 121$u$ and the magnetic pole teeth 121$d$ facing each other in the Z direction with the gaps therebetween, a thrust is applied to the field element (mover) 11 having the permanent magnets 111, and then the field element (mover) 11 reciprocates.

The field element (mover) 11 has its longitudinal direction coincident with the X direction, which is the direction in which the three permanent magnets 111 are arranged. The field element (mover) 11 has a flat plate shape, and has a plate surface (magnetic pole surfaces of the permanent magnets 111) perpendicular to the Z direction. The field element (mover) 11 and the armature 12 have a width direction in the Y direction that is perpendicular to the X direction and the Z direction, and the field element (mover) 11 has a thickness direction in the Z direction.

In the field element (mover) 11 and the armature 12, the numbers of the permanent magnets 111 and the sets of magnetic pole teeth 121$a$ are not limited to the numbers described above. In this embodiment, a plurality of the permanent magnets 111 and a plurality of the sets of magnetic pole teeth 121$a$ are provided. Moreover, a direction in which the field element (mover) 11 reciprocates may be hereinafter simply referred to as the axial direction.

<Linear Compressor Control System 100>

Figure 1:
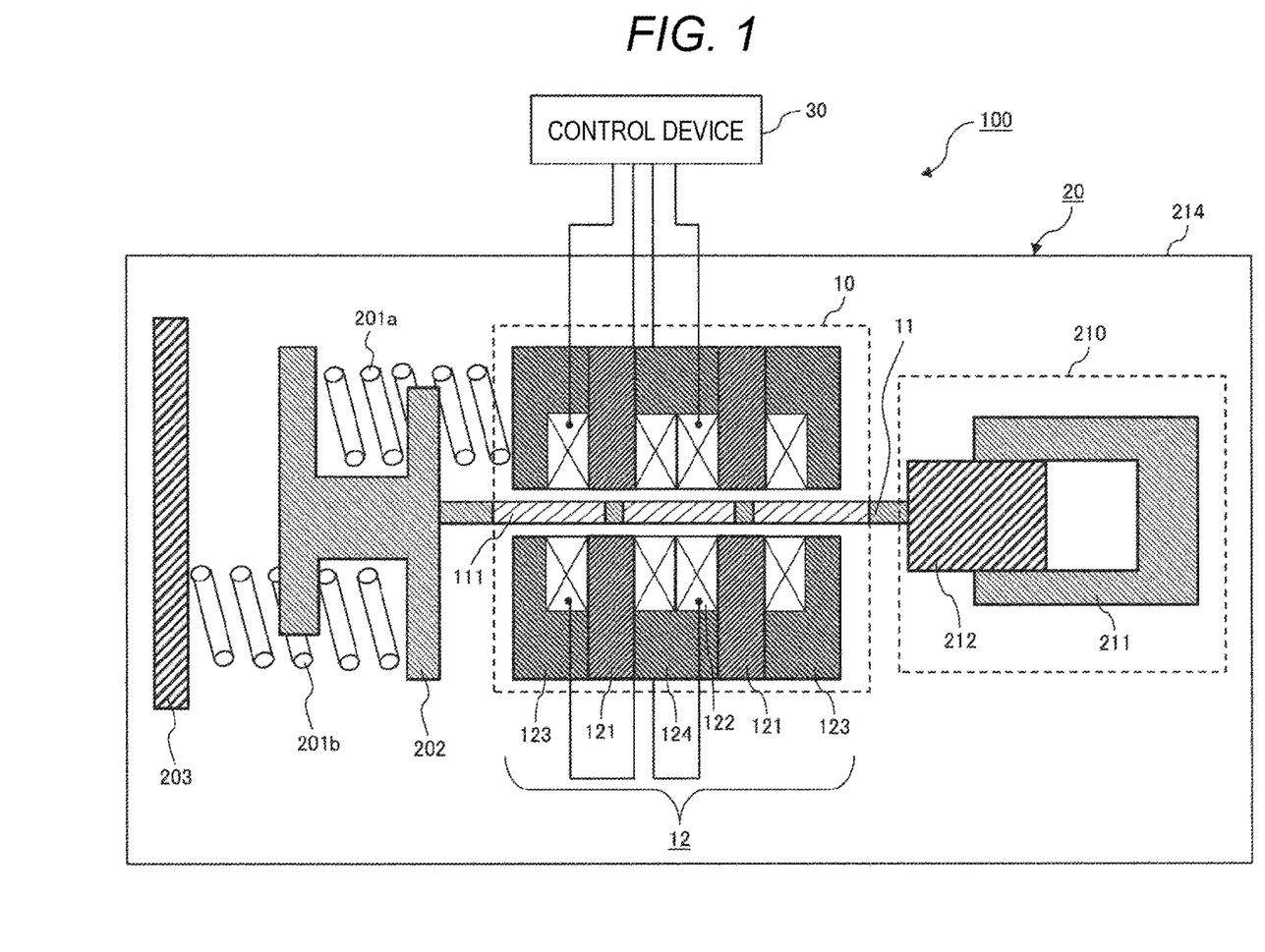
FIG. 1 is a longitudinal cross-sectional view in an axial direction of a linear compressor control system of a first embodiment according to one embodiment of the present invention.

FIG. 1 is a longitudinal cross-sectional view in an axial direction of a linear compressor control system 100 of a first embodiment according to one embodiment of the present invention.

As illustrated in FIG. 1, the linear compressor control system 100 is constituted by a linear compressor 20 and a control device 30, which will be described later in detail.

<Linear Compressor 20>

The linear compressor 20 is a reciprocating compressor in which a compression element 210, the linear motor 10, resonance springs 201$a$ and 201$b$ that are elastic bodies, an elastic body support member 202, and a base member 203 are arranged in an airtight container 214.

The compression element 210 includes a cylinder 211 and a piston 212. Working fluid supplied into the cylinder 211 via a suction pipe (not illustrated) is repeatedly compressed and discharged by the piston 212 reciprocating while sliding on an inner surface of the cylinder 211. The compressed working fluid is sent to a discharge pipe (not illustrated) communicating with the outside of the compressor. The suction pipe and the discharge pipe (not illustrated) are provided with check valves (not illustrated). The working fluid may be, for example, air or refrigerant for a refrigeration cycle.

The spacer 124 is constituted by, for example, a magnetic material, and the spacer 124 serves as a magnetic path, so a configuration can be adopted in which the windings 122 wound around the two sets of magnetic pole teeth 121$a$ that are spaced apart from each other in the axial direction are connected in series by wiring. Moreover, in a case where the spacer 124 is constituted by a non-magnetic material, the spacer 124 has a configuration that causes the two sets of magnetic pole teeth 121$a$ that are spaced apart from each other in the axial direction to be magnetically separated from each other, so a configuration can be adopted in which the windings 122 wound around these two sets of magnetic pole teeth 121$a$ are connected in parallel by wiring. That is, the windings 122 wound around the two sets of magnetic pole teeth 121$a$ may be wired in series so as to enable energization, or may be wired in parallel, and there is no particular limitation on the wiring. FIG. 1 illustrates, as an example, a configuration in which the spacer 124 is constituted by a non-magnetic material and the windings 122 wound around the two sets of magnetic pole teeth 121a are connected in parallel by wiring.

The field element (mover) 11 has a first end fixed to the piston 212 and a second end fixed to the elastic body support member 202. As for the resonance spring 201a and the resonance spring 201b, which are elastic bodies, the resonance spring 201a is mounted between the elastic body support member 202 and the armature 12, and the resonance spring 201b is mounted between the elastic body support member 202 and the base member 203. In this embodiment, the resonance spring 201a and the resonance spring 201b are constituted by coil springs, for example.

The armature 12 and the base member 203 are fixed portions, and the field element (mover) 11 resonates by receiving spring force of the resonance spring 201a and the resonance spring 201b via the elastic body support member 202.

A resonance phenomenon due to the resonance spring 201a, the resonance spring 201b, and the like can be utilized for efficient driving of the linear compressor 20. At that time, it is desirable to control a frequency of the current flowing through the windings 122 so that the field element (mover) 11 reciprocates at a resonance frequency determined by a mass of the field element (mover) 11, spring constants of the resonance spring 201a and the resonance spring 201b, and a pressure in the cylinder 211.

This embodiment shows a configuration in which the armature 12 is stationary in the X direction (horizontal direction) and the field element (mover) 11 reciprocates in the X direction (horizontal direction), but the configuration is not limited to this. For example, a configuration may be adopted in which the armature 12 reciprocates in the X direction (horizontal direction) and the field element 11 is stationary in the X direction (horizontal direction). Alternatively, a configuration may be adopted in which the armature 12 and the field element 11 reciprocate in the X direction (horizontal direction) at different speeds from each other. In either case, it is preferable to connect first ends of the resonance spring 201a and the resonance spring 201b to an object that moves in the X direction (horizontal direction).

Alternatively, a configuration may be adopted in which the armature 12 is stationary in the Z direction (vertical direction) and the field element (mover) 11 reciprocates in the Z direction (vertical direction), or a configuration may be adopted in which the armature 12 reciprocates in the Z direction (vertical direction) and the field element 11 is stationary in the Z direction (vertical direction). Furthermore, a configuration may be adopted in which the armature 12 and the field element (mover) 11 reciprocate in the Z direction (vertical direction) at different speeds from each other.

[Induced Voltage Constant]

Figure 4:
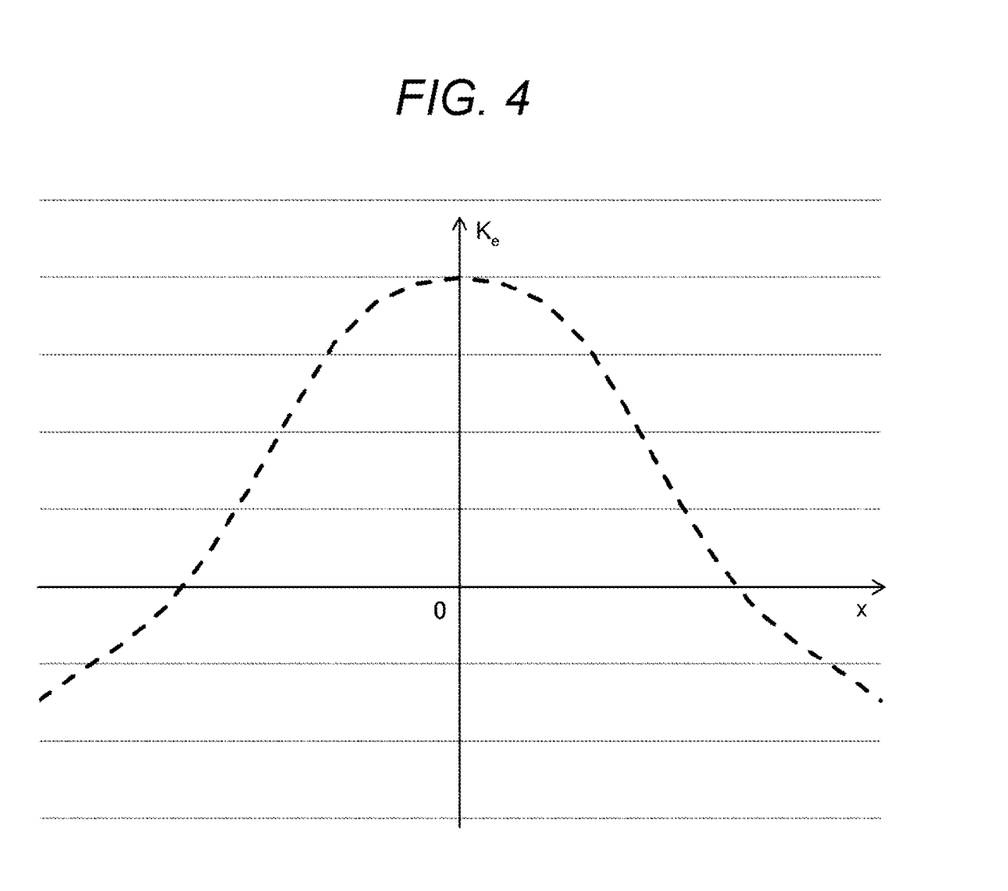
FIG. 4 illustrates a relationship of an induced voltage constant with respect to displacement of a mover.

FIG. 4 illustrates a relationship of an induced voltage constant with respect to displacement of the field element (mover) 11. In FIG. 4, a vertical axis represents an induced voltage constant Ke, and a horizontal axis represents a position x in the X direction of the center of the field element (mover) 11 (hereinafter referred to as the mover position x). As illustrated in FIG. 4, the induced voltage constant Ke is dependent on a change in mover position x, and has a characteristic of zero-crossing at a predetermined position.

[Formula 1]

$$K_e \frac{dx}{dt} = V_u - RI - L\frac{dI}{dt} \quad (1)$$

Formula (1) is a formula for an induced voltage E (Ke·dx/dt). Here, Vu is applied voltage, I is current, R is resistance, L is inductance, and t is time. R and L are motor parameters having constant values, and the induced voltage E can be calculated from the applied voltage Vu and the current I. The induced voltage E is obtained by multiplying the induced voltage constant Ke by the speed of the field element (mover) 11 (hereinafter referred to as the mover speed v), and the induced voltage E becomes "zero" at a top dead center and a bottom dead center where the mover speed v becomes "zero".

[Formula 2]

$$\frac{d}{dt}\left(K_e \frac{dx}{dt}\right) = \left(\frac{d}{dt}K_e\right)\frac{dx}{dt} + K_e \frac{d^2 x}{dt^2} \quad (2)$$

Formula (2) expresses a gradient of the induced voltage E by differentiating the induced voltage E with respect to time. In the vicinity of the top dead center and the bottom dead center, the mover speed v approaches "zero". Thus, a first term ((d/dt·Ke) dx/dt) on a right side of Formula (2) approaches "zero", so an influence of a second term (Ke·d²x/dt²) on the right side on the gradient of the induced voltage E increases. That is, the gradient of the induced voltage E at the top dead center and the bottom dead center is a product of the induced voltage constant Ke and an acceleration of the field element (mover) 11. Moreover, at a position where the induced voltage constant Ke becomes "zero", the gradient of the induced voltage E becomes "zero".

[Detection of Position of Field Element (Mover) 11]

From the position dependency of the induced voltage constant Ke illustrated in FIG. 4 and a relationship represented by Formula (2) described above, in a case where the top dead center and the bottom dead center are located at zero-crossings (zero-cross points) of the induced voltage constant Ke, the gradient of the induced voltage E is also "zero". That is, detecting whether the gradient of the induced voltage E is "zero" when the induced voltage E becomes "zero" makes it possible to detect whether or not the top dead center and the bottom dead center of the field element (mover) 11 have reached the zero-crossings (zero-cross points) of the induced voltage constant Ke.

As will be described later in detail, in a change in induced voltage E with respect to time (time waveform) obtained by multiplying a change in mover speed v with respect to time (time waveform) by a change in induced voltage constant Ke with respect to time (time waveform), the gradient of the induced voltage E is "zero" in most of the period (region) in which the induced voltage E is "zero", but the gradient of the induced voltage E is not always "zero" at the beginning or end of the period in which the induced voltage E is "zero". Thus, detecting whether the gradient of the induced voltage E is "zero" when the induced voltage E becomes "zero" makes it possible to detect whether or not the top dead center and the bottom dead center of the field element (mover) 11 have reached the zero-crossings (zero-cross points) of the induced voltage constant Ke.

[Design of Linear Motor 10 and Mover]

Figure 5:
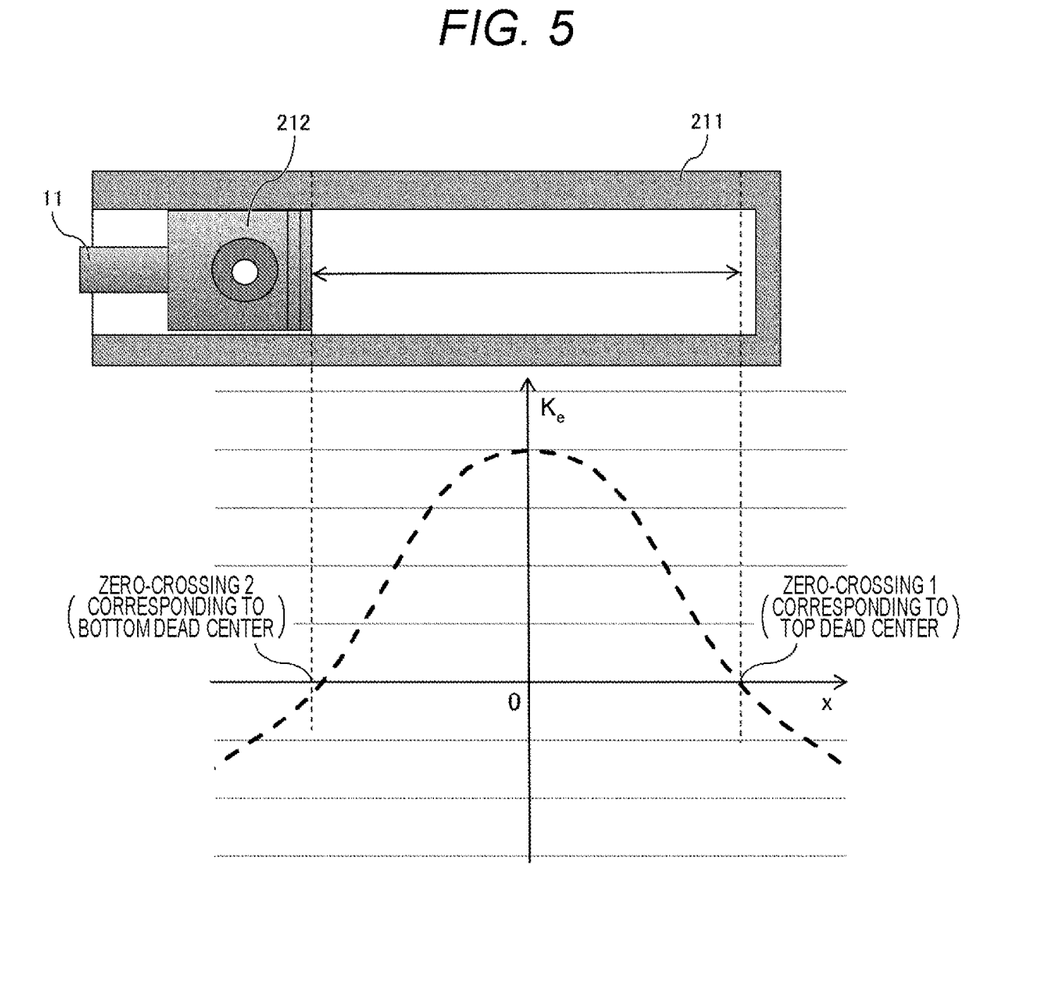
FIG. 5 is a diagram illustrating an example of a relationship between a stroke end of the mover and a zero-crossing of the induced voltage constant.

FIG. 5 is a diagram illustrating an example of a relationship between a stroke end of the mover and a zero-crossing (zero-cross point) of the induced voltage constant. As illustrated in FIG. 4 described above, the relationship of the induced voltage constant Ke with respect to the mover position x is dependent on a positional relationship between the field element (mover) 11 and the linear motor 10. Therefore, in order to efficiently drive the linear compressor 20, it is desirable to control the top dead center position of the field element (mover) 11 (a top dead center position of the piston 212), and in terms of position control, it is desirable to create a design in which a stroke end of the mover (piston 212) coincides with a zero-crossing (zero-cross point) of the induced voltage constant Ke, and the top dead center is at a maximum stroke.

That is, as illustrated in FIG. 5, it is desirable to create a design in which, in the relationship of the induced voltage constant Ke with respect to the mover position x illustrated in FIG. 4, the stroke ends coincide with zero-crossing 1 (corresponding to the top dead center of the piston 212) and zero-crossing 2 (corresponding to a bottom dead center of the piston 212). Note that the point at which a stroke end of the mover (piston 212) coincides with a zero-crossing (zero-cross point) of the induced voltage constant Ke is not limited to the top dead center. The point may be at the bottom dead center, or may be at both the top dead center and the bottom dead center.

A specific configuration and operation of the control device 30 constituting the linear compressor control system 100 will be described below.

<Control Device 30>

Figure 6:
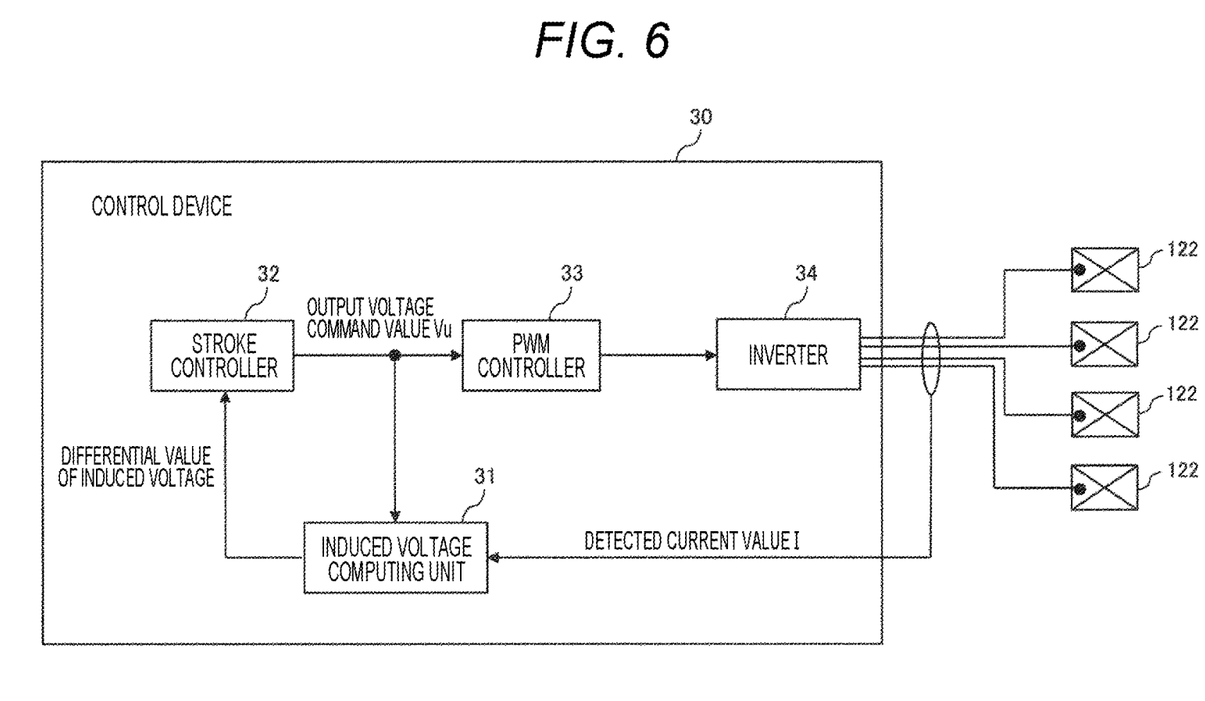
FIG. 6 is a block diagram of a control device illustrated in FIG. 1.

FIG. 6 is a block diagram of the control device 30 illustrated in FIG. 1. As illustrated in FIG. 6, the control device 30 includes an induced voltage computing unit 31, a stroke controller 32, a PWM controller 33, and an inverter 34.

The current flowing through the windings 122 of the linear motor 10 is detected as a detected current value I and input to the induced voltage computing unit 31. The induced voltage computing unit 31, which will be described later in detail, inputs the applied voltage Vu applied to the linear motor 10 as an output voltage command value Vu output from the stroke controller 32 to the PWM controller 33, and computes the induced voltage E and a differential value of the induced voltage E on the basis of the output voltage command value Vu and the detected current value I. Then, the induced voltage computing unit 31 outputs the computed differential value of the induced voltage E to the stroke controller 32.

The stroke controller 32, which will be described later in detail, compares the differential value of the induced voltage E input from the induced voltage computing unit 31 with a predetermined value. In a case where the differential value of the induced voltage E has not reached the predetermined value, the stroke controller 32 controls the stroke by executing processing such as increasing the output voltage command value Vu. The stroke controller 32 outputs the output voltage command value Vu to the PWM controller 33 and the induced voltage computing unit 31.

The PWM controller 33 uses a known pulse width modulation by comparing the output voltage command value Vu input from the stroke controller 32 and a triangular wave carrier signal, generates a drive signal in accordance with the output voltage command value Vu, and outputs the generated drive signal to the inverter 34.

The inverter 34 includes, for example, a full-bridge circuit (not illustrated). The full-bridge circuit switches a direct-current voltage source (not illustrated) in accordance with the drive signal input from the PWM controller 33 to output a voltage to the linear motor 10. The full-bridge circuit includes four switching elements 122, which constitute a first pair of upper and lower arms (U phase) having two switching elements connected in series, and a second pair of upper and lower arms (V phase) having two switching elements. The switching elements can perform a switching operation in accordance with a pulsed gate signal output from a gate driver circuit (not illustrated) on the basis of a drive signal generated by the PWM controller 33.

It is possible to output a direct-current voltage of the direct-current voltage source, which corresponds to an alternating-current voltage, to the windings 122 by controlling conduction states (ON/OFF) of the switching elements. Note that a direct-current source may be used instead of the direct-current voltage source. For example, semiconductor switching elements such as IGBTs or MOS-FETs can be adopted as the switching elements.

Figure 7:
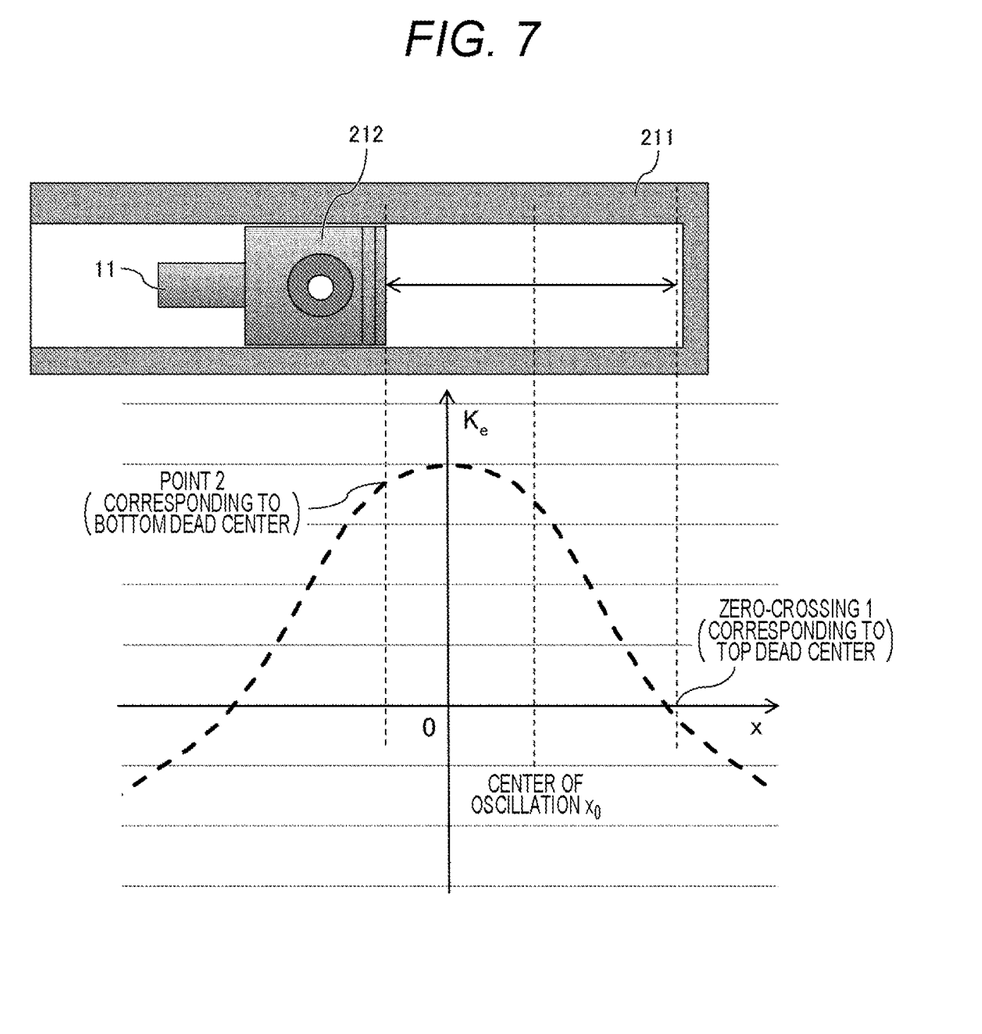
FIG. 7 is a diagram illustrating another example of the relationship between a stroke end of the mover and a zero-crossing of the induced voltage constant.

FIG. 7 is a diagram illustrating another example of the relationship between a stroke end of the mover and a zero-crossing of the induced voltage constant Ke. Unlike FIG. 5 described above, a center of oscillation $x_0$ is deviated to the top dead center side. Thus, as illustrated in FIG. 7, in the relationship of the induced voltage constant Ke with respect to the mover position x, the top dead center of the mover (piston 212) corresponds to zero-crossing 1, where the induced voltage constant Ke becomes "zero", but the bottom dead center of the mover (piston 212) corresponds to point 2, where the induced voltage constant Ke is only slightly decreased. The description below assumes that the linear compressor 20 has the relationship between the linear motor 10 and the mover designed as described above.

[Induced Voltage Computing Unit 31]

Figure 8:
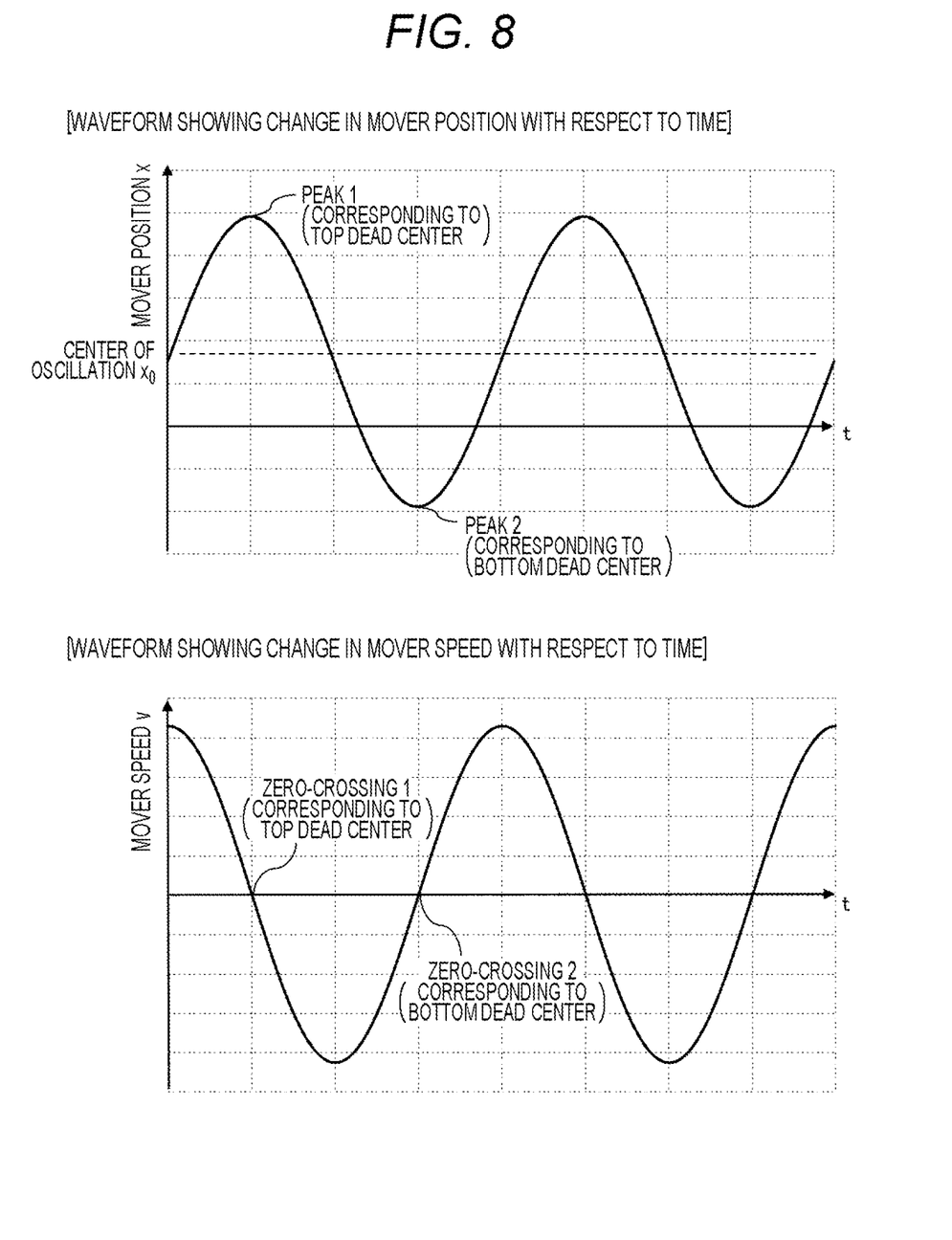
FIG. 8 is an explanatory diagram of a waveform showing a change in mover position with respect to time and a waveform showing a change in mover speed with respect to time.

FIG. 8 is an explanatory diagram of a waveform showing a change in mover position x with respect to time and a waveform showing a change in mover speed v with respect to time. In the linear compressor 20 having the relationship between the linear motor 10 and the mover designed as illustrated in FIG. 7 described above, the waveform showing the change in mover position x with respect to time (time waveform) becomes a sinusoidal waveform having an offset of the center of oscillation $x_0$. The mover position x shows peak 1 at the top dead center of the mover (piston 212), and the mover position x shows peak at the bottom dead center. Moreover, the waveform showing the change in mover speed v with respect to time (time waveform) becomes a sinusoidal waveform. The top dead center of the mover (piston 212) corresponds to zero-crossing 1, where the mover speed v becomes "zero", and the bottom dead center of the mover (piston 212) corresponds to zero-crossing 2, where the mover speed v also becomes "zero".

Figure 9:
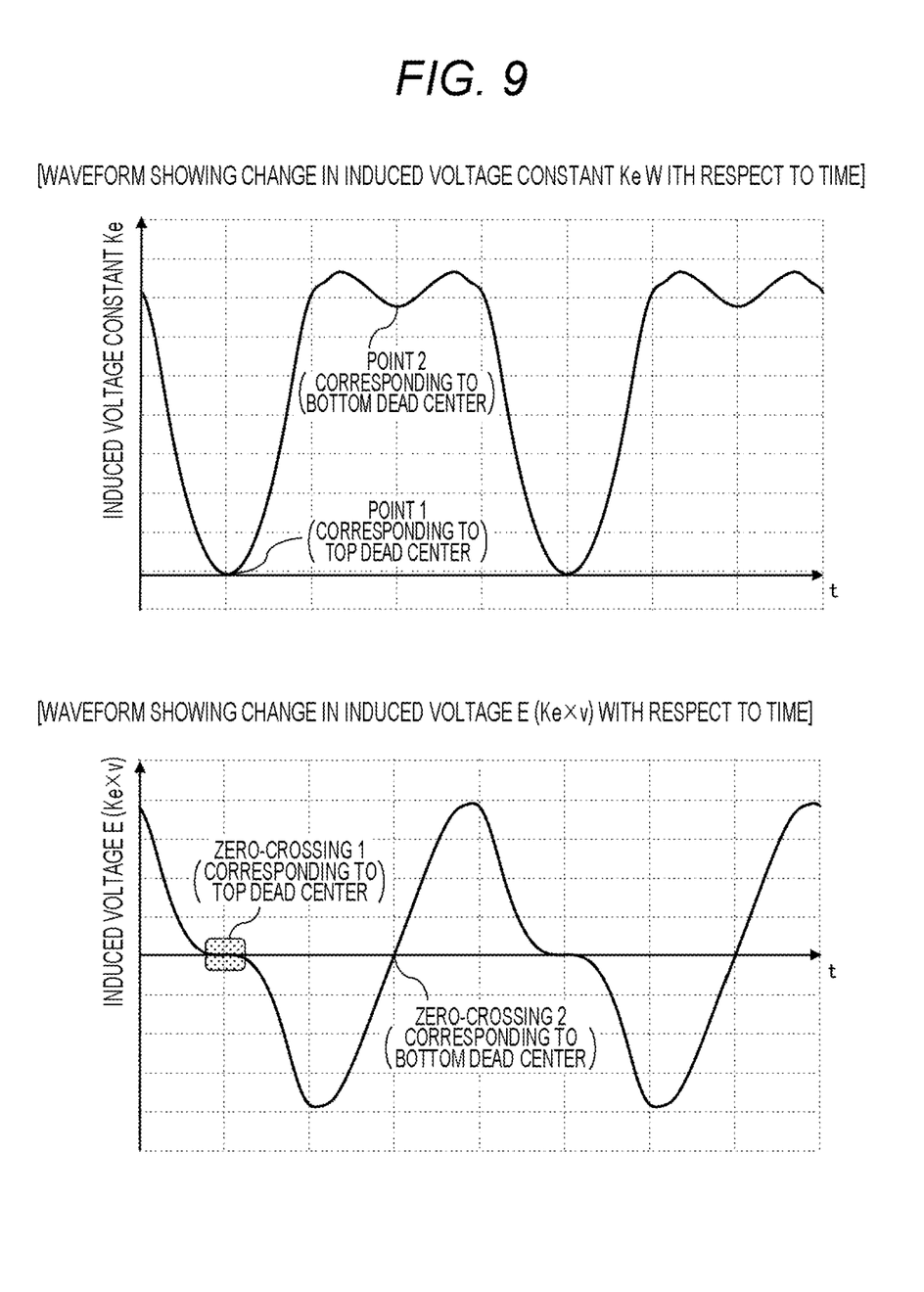
FIG. 9 is an explanatory diagram of a waveform showing a change in induced voltage constant with respect to time and a waveform showing a change in induced voltage with respect to time.

FIG. 9 is an explanatory diagram of a waveform showing the change in induced voltage constant Ke with respect to time and a waveform showing the change in induced voltage E with respect to time. As shown in the waveform showing the change in induced voltage constant Ke with respect to time (time waveform), the top dead center of the mover (piston 212) corresponds to zero-crossing 1, where the induced voltage constant Ke becomes "zero", but the bottom dead center of the mover (piston 212) corresponds to point 2, where the induced voltage constant Ke is only slightly decreased. Moreover, the induced voltage E is a value obtained by multiplying the induced voltage constant Ke by the mover speed v, so the waveform showing the change in induced voltage E with respect to time (time waveform) is a time waveform obtained by multiplying the waveform showing the change in mover speed v with respect to time (time waveform) illustrated in FIG. 8 by the waveform showing the change in induced voltage constant Ke with respect to time (time waveform) illustrated in FIG. 9. As shown in the waveform showing the change in induced voltage E with respect to time (time waveform), at the top dead center of the mover (piston 212), there is a period (region) at zero-crossing 1 in which the induced voltage E becomes "zero" as indicated by hatching. On the other hand, at the bottom dead center of the mover (piston 212), the induced voltage E becomes "zero" at zero-crossing 2.

As illustrated in FIG. 6, on the basis of the input detected current value I and the output voltage command value Vu input from the stroke controller 32, the induced voltage computing unit 31 computes Formula (1) described above to obtain the induced voltage E (induced voltage constant Ke×mover speed v) as Ke·dx/dt. When the induced voltage computing unit 31 detects that the obtained induced voltage E (induced voltage constant Ke×mover speed v) is "zero" (0 V), the induced voltage computing unit 31 subsequently computes Formula (2) described above to obtain d/dt (Ke·dx/dt), which is a differential value of the induced voltage E. In other words, being triggered by the induced voltage E obtained by computing Formula (1) described above becoming 0 V, the induced voltage computing unit 31 computes Formula (2) described above to obtain a differential value of the induced voltage E (the gradient of the induced voltage E). The induced voltage computing unit 31 outputs the obtained differential value of the induced voltage E (the gradient of the induced voltage E) to the stroke controller 32.

Note that, as shown in the waveform showing the change in induced voltage E with respect to time (time waveform), at the top dead center of the mover (piston 212), there is a period (region) at zero-crossing 1 in which the induced voltage E becomes "zero" (0 V) as indicated by hatching. At the beginning or end of this period (region) indicated by hatching in which the induced voltage E becomes "zero" (0 V), the gradient of the induced voltage E is not always "zero" as described above.

[Stroke Controller 32]

The stroke controller 32 compares, with a predetermined value, the differential value of the induced voltage E (the gradient of the induced voltage E) when the induced voltage E is 0 V, which is input from the induced voltage computing unit 31. As a result of the comparison, if the differential value of the induced voltage E (the gradient of the induced voltage E) has not reached the predetermined value, the stroke controller 32 determines that the mover (piston 212) has not reached the top dead center and/or the bottom dead center. Then, if the mover (piston 212) has not reached the top dead center, that is, if the top dead center has not reached the zero-crossing (zero-cross point) in the relationship between the induced voltage constant Ke and the mover position x, the output voltage command value Vu is increased, or a positive direct-current component is added to the output voltage command value Vu, and then the output voltage command value Vu is output to the PWM controller 33 and the induced voltage computing unit 31. This makes it possible to extend the mover amplitude and bring it closer to the zero-crossing (zero-cross point).

On the other hand, as a result of the comparison, if the differential value of the induced voltage E (the gradient of the induced voltage E) exceeds the predetermined value, that is, if the top dead center exceeds the zero-crossing (zero-cross point) in the relationship between the induced voltage constant Ke and the mover position x, the stroke controller 32 reduces the output voltage command value Vu or adds a negative direct-current component to the output voltage command value Vu, and then outputs the output voltage command value Vu to the PWM controller 33 and the induced voltage computing unit 31. This allows the top dead center to be closer to the zero-crossing (zero-cross point) in the relationship between the induced voltage constant Ke and the mover position x.

Note that the predetermined value may be the zero-crossing (zero-cross point), or may be a certain value.

Next, an operation of the control device 30 will be described.

<Operation of Control Device 30>

Figure 10:
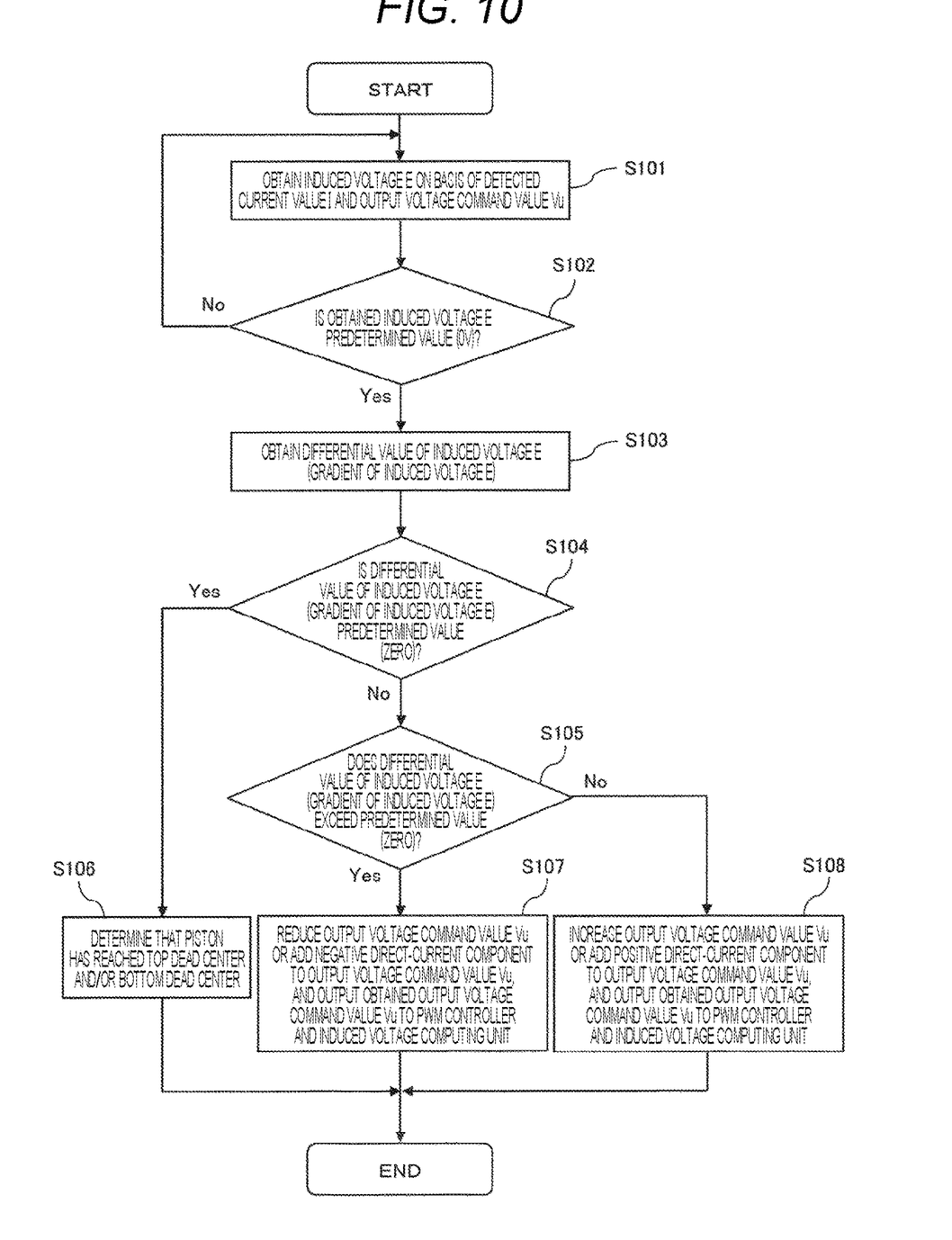
FIG. 10 is a flowchart illustrating an operation of the control device illustrated in FIG. 1.

FIG. 10 is a flowchart illustrating the operation of the control device 30 illustrated in FIG. 1. As illustrated in FIG. 10, in step S101, on the basis of a detected current value I, which is a detection value of a current flowing through the windings 122 of the linear motor 10 and an output voltage command value Vu input from the stroke controller 32 constituting the control device 30 described above, the induced voltage computing unit 31 constituting the control device 30 computes Formula (1) described above to obtain the induced voltage E (induced voltage constant Ke×mover speed v) as Ke·dx/dt.

In step S102, the induced voltage computing unit 31 determines whether or not the obtained induced voltage E is 0 V, which is the predetermined value. As a result of the determination, if the obtained induced voltage E is the predetermined value (0 V), the operation proceeds to step S103. On the other hand, as a result of the determination, if the obtained induced voltage E is not the predetermined value (0 V), the operation returns to step S101.

In step S103, the induced voltage computing unit 31 computes Formula (2) described above to obtain d/dt (Ke·dx/dt), which is a differential value of the induced voltage E, as a gradient of the induced voltage E. Then, the obtained induced voltage computing unit 31 outputs the obtained differential value of the induced voltage E (the gradient of the induced voltage E) to the stroke controller 32.

In step S104, the stroke controller 32 determines whether or not the differential value of the induced voltage E (the gradient of the induced voltage E) input from the induced voltage computing unit 31 is the predetermined value (zero). As a result of the determination, if the differential value of the induced voltage E (the gradient of the induced voltage E) is the predetermined value (zero), the operation proceeds to step S106. In step S106, the stroke controller 32 determines that the piston 212 has reached the top dead center and/or the bottom dead center. On the other hand, as a result of the determination, if the differential value of the induced voltage E (the gradient of the induced voltage E) is not the predetermined value (zero), the operation proceeds to step S105.

In step S105, the stroke controller 32 determines whether or not the differential value of the induced voltage E (the gradient of the induced voltage E) exceeds the predetermined value (zero). As a result of the determination, if the differential value of the induced voltage E (the gradient of the induced voltage E) exceeds the predetermined value (zero), the output voltage command value Vu is reduced, or a negative direct-current component is added to the output voltage command value Vu, and then the output voltage command value Vu is output to the PWM controller 33 and the induced voltage computing unit 31. On the other hand, if the stroke controller 32 determines that the differential value of the induced voltage E (the gradient of the induced voltage E) is less than the predetermined value (zero), the operation proceeds to step S108.

In step S108, the stroke controller 32 increases the output voltage command value Vu or adds a positive direct-current component to the output voltage command value Vu, and outputs the obtained output voltage command value Vu to the PWM controller 33 and the induced voltage computing unit 31.

Depending on a capacity of the linear compressor 20, the amplitude value in the waveform showing the change in induced voltage E with respect to time (time waveform) varies. Thus, being triggered by the induced voltage E becoming 0 V, it is determined whether or not the gradient of the induced voltage E (a differential value of the induced voltage E) at that time is zero, and this makes it possible to determine with high accuracy whether the mover (piston 212) has reached the top dead center and/or the bottom dead center. Note that it is also possible to adopt a configuration in which the amplitude value in the waveform showing the change in induced voltage E with respect to time (time waveform) of the linear compressor 20 that varies in capacity is normalized, and when it is detected that the induced voltage E has become 0 V, it is determined whether or not the gradient of the induced voltage E (the differential value of the induced voltage E) at that time is "zero". In any case, it is desirable that whether or not the gradient of the induced voltage E (the differential value of the induced voltage E) is "zero" is determined at a timing when the induced voltage E becomes 0 V, but this is not always the case. For example, it is possible to adopt a configuration in which efficiencies of linear compressors with different capacities when the gradient of the induced voltage E (the differential value of the induced voltage E) is near "zero" are evaluated in advance, an allowable gradient of the induced voltage E (the differential value of the induced voltage E) is obtained, and a region in the time waveform of the induced voltage E corresponding to the allowable gradient of the induced voltage E (the differential value of the induced voltage E) is specified, so that a wider range of values of the induced voltage E can serve as a trigger for determining the gradient of the induced voltage E (the differential value of the induced voltage E). In other words, the induced voltage E that serves as a trigger for determination may have a margin of zero plus or minus several percent.

Note that the linear compressor and the linear compressor control system in the first embodiment described above can be used for a compressor for pumping refrigerant in an air conditioner including a heat exchanger functioning as a condenser or an evaporator.

Moreover, the linear compressor and the linear compressor control system in the first embodiment described above can be used for a compressor that compresses working fluid to adjust a vehicle height in an air suspension. Furthermore, the linear compressor and the linear compressor control system in the first embodiment described above can also be used for a compressor that pumps liquid refrigerant in a refrigerator having a condenser and an evaporator.

Furthermore, the linear compressor and the linear compressor control system in the first embodiment described above can also be used for a refrigeration air conditioner, such as a cryostat or an air conditioner.

As described above, this embodiment can provide a linear compressor and a linear compressor control system that do not require a sensor for detecting the position of the mover, and can compute the mover position with high accuracy in consideration of the position dependency of the induced voltage constant.

Moreover, according to this embodiment, focusing on the fact that the induced voltage constant Ke is dependent on the position of the mover without considering an influence of the resonance springs and the like, the induced voltage E and the differential value of the induced voltage E (the gradient of the induced voltage E) are obtained by computation on the basis of the detected current value I and the output voltage command value Vu, so that the mover position can be detected with high accuracy.

Note that the present invention is not limited to the embodiment described above, but includes various modifications.

For example, the embodiment described above has been described in detail in order to describe the present invention in an easy-to-understand manner, and is not necessarily limited to those having all the configurations described.

REFERENCE SIGNS LIST 10 linear motor
11 field element (mover)
12 armature
20 linear compressor
30 control device
31 induced voltage computing unit
32 stroke controller
33 PWM controller
34 inverter
100 linear compressor control system
111 permanent magnet
121 magnetic pole
121a set of magnetic pole teeth
121u magnetic pole tooth
121d magnetic pole tooth
122 winding
123 end bridge
124 spacer
201a, 201b resonance springs
202 elastic body support member
203 base member
210 compression element
211 cylinder
212 piston
214 airtight container

The invention claimed is:
1. A linear compressor, comprising:
a field element having a first end connected to an elastic body and including a permanent magnet, an armature having a winding wound around a magnetic pole, and a linear motor that causes the field element and the armature to reciprocate relatively in an axial direction,
wherein a stroke of a piston connected to a second end of the field element is controlled so that a top dead center and/or a bottom dead center of the stroke of the piston correspond to a portion in a stroke cycle when a gradient of an induced voltage of zero is within a predetermined range, the predetermined range is computed on the basis of a voltage command value output to the linear motor and a value of a current flowing through the winding is at a predetermined value, and
wherein the piston reaches the top dead center and/or the bottom dead center when the gradient of the induced voltage when the induced voltage is zero volts is zero.

2. The linear compressor according to claim 1, wherein the elastic body is resonance springs comprising:
a first resonance spring mounted between the armature and an elastic body support member to which the second end of the field element is fixed, and
a second resonance spring mounted between the elastic body support member and a base member.

3. A linear compressor comprising
a field element having a first end connected to an elastic body and including a permanent magnet, an armature having a winding wound around a magnetic pole, and a linear motor that causes the field element and the armature to reciprocate relatively in an axial direction,
wherein a stroke of a piston connected to a second end of the field element is controlled so that a top dead center and/or a bottom dead center of the stroke of the piston correspond to a portion in a stroke cycle when a gradient of an induced voltage of zero is within a predetermined range, the predetermined range is computed on the basis of a voltage command value output to the linear motor and a value of a current flowing through the winding is at a predetermined value, and
wherein the stroke of the piston becomes larger to allow the piston to reach the top dead center when the gradient of the induced voltage when the computed induced voltage is zero volts is not zero.

4. A linear compressor control system, comprising:
a field element having a first end connected to an elastic body and including a permanent magnet, an armature having a winding wound around a magnetic pole, and a linear motor that causes the field element and the armature to reciprocate relatively in an axial direction; and
a control device that controls a voltage applied to the winding on the basis of at least a current flowing through the winding,
wherein the control device obtains an induced voltage on the basis of a voltage command value output to the linear motor and a value of the current flowing through the winding obtains, as a gradient of the induced voltage, a differential value of the induced voltage when the induced voltage is zero volts, and performs a control to cause a portion in a stroke cycle when the gradient of the induced voltage when the induced voltage is at a predetermined value is within a predetermined range to correspond to a top dead center and/or a bottom dead center of a stroke of a piston connected to a second end of the field element, and
wherein the control device determines that the piston has reached the top dead center and/or the bottom dead center when the differential value of the induced voltage is zero.

5. The linear compressor control system according to claim 4, wherein
when the differential value of the induced voltage has not reached the predetermined value, the control device increases the voltage command value or adds a positive direct-current component to the voltage command value.

6. The linear compressor control system according to claim 4, wherein
when the differential value of the induced voltage exceeds the predetermined value, the stroke controller reduces the voltage command value or adds a negative direct-current component to the voltage command value.

7. The linear compressor control system according to claim 5, wherein
the control device only obtains the differential value of the induced voltage when the induced voltage is zero volts.

8. The linear compressor control system according to claim 7, wherein
the elastic body is resonance springs comprising
a first resonance spring mounted between the armature and an elastic body support member to which the second end of the field element is fixed, and
a second resonance spring mounted between the elastic body support member and a base member.

\* \* \* \* \*